United States Patent Office 2,952,643
Patented Sept. 13, 1960

2,952,643

PRODUCTION OF IMPROVED SOLID CATALYSTS

Hervey H. Voge, Berkeley, Calif., assignor to Shell Oil Company, New York, N.Y., a corporation of Delaware No Drawing. Filed Aug. 11, 1958, Ser. No. 754,144

13 Claims. (Cl. 252—430)

This invention relates to an improvement in the production of solid catalysts and to the novel catalysts so produced. More particularly the invention relates to catalysts containing potassium in the form of potassium carbonate, potassium hydroxide, or potassium oxide.

It is well known that potassium is a very desirable promoter in many catalysts useful in a variety of types of catalytic conversions. By way of example the following types of catalysts may be mentioned: (1) cerium promoted chromium oxide-alumina catalysts for the cyclization-dehydrogenation of normal paraffin hydrocarbons to aromatic hydrocarbons; (2) iron base ammonia synthesis catalysts; (3) iron base Fischer-Tropsch catalysts; (4) water gas shift catalysts based primarily upon iron, chromium, and manganese oxides, or mixtures thereof; (5) nickel and cobalt silicate catalysts for the amination of olefins; (6) nickel, iron and/or cobalt catalysts for the dehydrogenation of olefins and/or alkyl aromatic hydrocarbons to the corresponding diolefins and styrene type hydrocarbons, respectively; (7) molybdena-alumina catalyst for the selective desulfurization of olefinic gasolines; (8) special catalysts comprising the heavy metal chromites, molybdenites and/or wolframites for the hydrogenation of various organic compounds and/or inorganic sulfur compounds and/or the reduction of nitrates. These and many other catalysts suitable for these and other reactions are frequently promoted by potassium in the form of one of the mentioned potassium compounds.

In most cases because of availability, low cost, and the absence of deleterious anions such as sulfate, nitrate, halides, etc. the potassium is incorporated in the catalyst in the form of potassium carbonate, potassium hydroxide or potassium oxide, generally the carbonate.

The potassium compound is generally introduced as such during the mixing of the catalyst ingredients and prior to forming the mixture into pellets or other particulate bodies, but it may also be introduced later.

These potassium compounds are hygroscopic. Consequently the catalysts containing these compounds tend to pick up water from the air during packaging, handling and so forth. This is undesirable because it generally results in a considerable weakening of the mechanical strength of the pellets (particularly when these are formed by pelleting the moist powder of catalyst ingredients followed by drying). It also leads to bleeding of the catalyst and maldistribution of the potassium promoter. These difficulties have been recognized but the partial solution has been generally to store and ship the catalyst in costly sealed containers and to avoid exposure of the catalyst to air as far as possible during packaging, loading of the reactors, etc.

According to my invention such catalysts containing potassium carbonate, hydroxide, or other alkaline hygroscopic potassium compound, such as the oxide, are produced in a form in which they are not so adversely affected by exposure to air. This is done by exposing the catalyst pellets as a step in their manufacture and after the formation of the pellets, e.g. by pressing or extruding, to vapors of an organic compound polymerizable to a solid or rubber like polymer by the alkaline action of the potassium compound. This treatment of the catalyst pellets may be done before or after the drying, if drying is normally used as a final step in the preparation of the pellets. If the catalyst particles are prepared by pressing the dry mixture the treatment should follow the pressing. If, on the other hand, the catalyst pellets are normally subjected to a calcination treament the treatment should follow such calcination.

In general any organic compound which is readily vaporizable and will readily polymerize to a solid, resinous, or plastic material by the alkaline action of the potassium compound, e.g. the carbonate, may be used. Materials known in the polymer field as resin monomers may be polymerized to their respective polymers or resins by two basic mechanisms, namely, a free radical mechanism and an ionic mechanism. Thus, the monomers the polymerization of which is catalyzed by alkalis in general, and potassium carbonate in particular, polymerize by the ionic mechanism and may be used. One sub-class of suitable compounds consists of the monomers of unsaturated aldehyde polymers. Another sub-class consists of the monomers of unsaturated ketone polymers. A third sub-class consists of the monomers of the epoxide polymers. These are all well known sub-classes of materials which polymerize by the ionic mechanism. By way of example suitable materials representative of these sub-classes are acrolein, methacrolein, methyl vinyl ketone, methyl isopropenyl ketone, ethylene oxide, propylene oxide. Of the latter propylene oxide is preferred over ethylene oxide since the resulting polymer is more hydrophobic and much less soluble in water.

The monomer and hence the resulting polymer should be preferably substantially free of halogens.

In treating the catalyst pellets they are simply exposed to the vapors of the appropriate monomer or mixture of monomers. This can be done in any convenient manner. One suitable way is to place the catalyst pellets in a tubular reactor and pass the vapors of the monomer through the reactor until the desired amount of polymer has been produced on the catalyst surface. When the vapors of the monomer are passed through the reactor without any diluent the temperature in the reactor should at least approach the boiling point of the monomer at the prevailing pressure and is preferably somewhat higher. However, the vapor of the monomer may be diluted with air or other inert gas, such for instance as natural gas, in which case lower temperatures down to ambient temperatures can be applied. The preferred temperature depends upon the reactivity of the particular monomer used and the amount of the potassium carbonate in the catalyst and may vary considerably. In general temperatures from room temperature up to about 200° C. are most convenient. Higher temperatures can be used at least in some cases but the temperature should in no case be sufficiently high to cause decomposition of the polymer. A small amount of water vapor may be desirable to promote the alkaline catalysis of the polymerizations.

The operation may be carried out at any pressure. However, pressures around atmospheric are suitable and preferred.

The time required to effect the treatment of the catalyst depends upon the activity of the particular monomer used, the temperature applied, the amount of potassium compound in the catalyst, and the amount of polymer that it is desired to apply to the surface of the catalyst. The treatment may be continued for several hours to incorporate 25% by weight or more of polymer, based on the catalyst. Generally, however, much smaller amounts of polymer down to about 1% by weight of the catalyst are sufficient to materially improve the catalyst and the amounts around 5% are generally ample.

Following the described treatment of the catalyst particles with the monomer the catalyst pellets require no further treatment and may be packaged for shipment. However, in most cases it will be desired to flush the catalyst pellets with heated air or other gas to remove residual vapors of the monomer as these generally have offensive odors.

The catalysts of the invention prepared as above may often be simply charged to the reactor and used for their intended purpose. In other cases it is desirable to pretreat the catalyst in the reactor in which it is to be used. The latter pretreatment may be any suitable treatment which decomposes and removes the polymer. Thus, for example, the catalyst containing the polymer may be charged to the reactor in which it is to be used and steamed at 500–600° C. for a few hours or it may be treated with a mixture of steam and air. In other cases the reactor containing the catalyst in place may be flushed with a solvent for the polymer.

*Example I*

The catalyst of this example consisted of iron oxide, chromium oxide and potassium carbonate and was prepared by moistening the respective powders, extruding into 3/16" pellets, drying the pellets with hot air and calcining at about 600° C. The potassium carbonate content of the catalyst was about 35%. These calcined pellets had an average crushing strength of about 12.4 pounds. Upon exposure to humid air for 28 hours at room temperature the pellets became mushy and had no strength.

A portion of the calcined pellets was treated with vapors of acrolein at atmospheric pressure for 25 hours at 27° C. whereupon acrolein polymer was formed on the catalyst surface and the pellets gained 15% in weight. After exposing the thus treated pellets to humid air at room temperature for 28 hours as with the control the pellet strength was at least as high as the control before such exposure.

When the catalyst pellets were heated to about 700° C. in air the polymer burned off but the pellets did not become weak.

*Example II*

Commercial 3/16" pellets similar to those of Example I were dried at 120° C. and then treated with vapors of acrolein. To aid uniformity of treatment the pellets were periodically agitated. The treatment was at atmospheric pressure and room temperature and was continued for somewhat over 24 hours. After this treatment the pellets were found to have gained about 5.3% in weight. The pellets having a strong odor of acrolein were then dried at 120° C. This caused a weight loss of 0.6% and dispelled the odor.

The original dried but untreated pellets had a crushing strength of about 13.5 pounds. After exposure to ambient atmosphere for 6 hours the crushing strength was about 2 pounds.

The pellets treated with acrolein vapors, on the other hand, after exposure to the ambient atmosphere for 6 hours had a crushing strength at least equal to the control before such exposure.

*Example III*

Similar results may be obtained when methacrolein and methyl-vinyl ketone are used. However, tested monomers which are polymerized by the free radical mechanism were ineffective. Thus pellets similar to those in Example I were treated with vapors of styrene, divinyl benzene, and acrylonitrile for 25 hours at 27° C. After exposure of the treated pellets to the atmosphere for 28 hours the pellets treated with styrene and divinyl benzene were mushy. Those treated with acrylonitrile gained 13% in weight but were weak.

*Example IV*

Catalyst pellets treated as in Example II were charged to a reactor and used for the dehydrogenation of butylene to butadiene. The pellets were first steamed for two hours at 620° C. to remove the polymer. Then at this same temperature a 12:1 mole mixture of steam and normal butylene was passed over the catalyst at essentially atmospheric pressure and a gaseous hourly space velocity of 500. The activity and selectivity of the catalyst for the production of butadiene were found to be equal to that of the control catalyst which was not treated with acrolein.

I claim as my invention:

1. In the preparation of a particulate inorganic solid catalyst containing iron and potassium in the form of a hygroscopic alkaline compound selected from the group consisting of potassium carbonate, potassium hydroxide, and potassium oxide the improvement which comprises treating the particles of the catalyst prior to use thereof with vapors of an organic short chain compound polymerizable through an ionic mechanism to a solid polymer by the alkaline action of the said potassium compound, said polymerizable compound being selected from the group consisting of unsaturated aldehyde and unsaturated ketone for a time and under conditions of temperature and pressure to produce on the surface of the catalyst at least about 1% by weight of solid polymer of said polymerizable compound.

2. In the preparation of a particulate inorganic solid catalyst containing iron and potassium in the form of potassium carbonate the improvement which comprises treating the particles of the catalyst prior to use thereof with vapors of an organic short chain compound selected from the group consisting of unsaturated aldehyde and unsaturated ketone which compound is polymerizable through an ionic mechanism to a solid polymer by the alkaline action of the said potassium carbonate for a time and under conditions of temperature and pressure to produce on the surface of the catalyst at least about 1% by weight of solid polymer of said compound.

3. Process according to claim 1 in which the said polymer is a polymer of acrolein.

4. Process according to claim 1 in which the said polymer is a polymer of methacrolein.

5. Process according to claim 1 in which the said polymer is a polymer of methyl vinyl ketone.

6. Process according to claim 1 in which the said polymer is a polymer of methyl isopropenyl ketone.

7. An inorganic solid particulate catalyst containing iron and potassium in the form of a hygroscopic alkaline compound selected from the group consisting of potassium carbonate, potassium hydroxide, and potassium oxide and at least 1% by weight of a polymeric resin produced in situ on the surface of said catalyst by the polymerization of vapors of the short chain monomer of said resin through an ionic mechanism promoted by the alkaline action of said potassium compound, said polymerizable compound being selected from the group consisting of unsaturated aldehyde and unsaturated ketone.

8. A solid particulate catalyst according to claim 7 in which said resin is a polymer of acrolein.

9. A solid particulate catalyst according to claim 7 in which said resin is a polymer of methacrolein.

10. A solid particulate catalyst according to claim 7 in which said resin is a polymer of methylvinyl ketone.

11. A solid particulate catalyst according to claim 7 in which said resin is a polymer of methyl isopropenyl ketone.

12. An inorganic solid particulate catalyst according to claim 7 consisting predominantly of iron oxide and potassium carbonate and containing from 1 to 25% of said resin based on the inorganic portion of said catalyst.

13. An inorganic solid particulate catalyst containing iron and potassium carbonate and from about 1% to about 25% by weight of a polymeric resin produced in situ on the surface of said catalyst by the polymerization of vapors of the short chain monomer of said resin through an ionic mechanism promoted by the action of said potassium carbonate.

References Cited in the file of this patent

UNITED STATES PATENTS

| | | |
|---|---|---|
| 2,509,869 | Kirshenbaum | May 30, 1950 |
| 2,540,599 | Segura | Feb. 6, 1951 |
| 2,842,504 | Jones | July 8, 1958 |
| 2,866,790 | Pitzer | Dec. 30, 1958 |